May 1, 1923.
W. J. JACOBS
APPARATUS FOR DRAWING SHEET GLASS
Filed Jan. 4, 1919
1,453,842
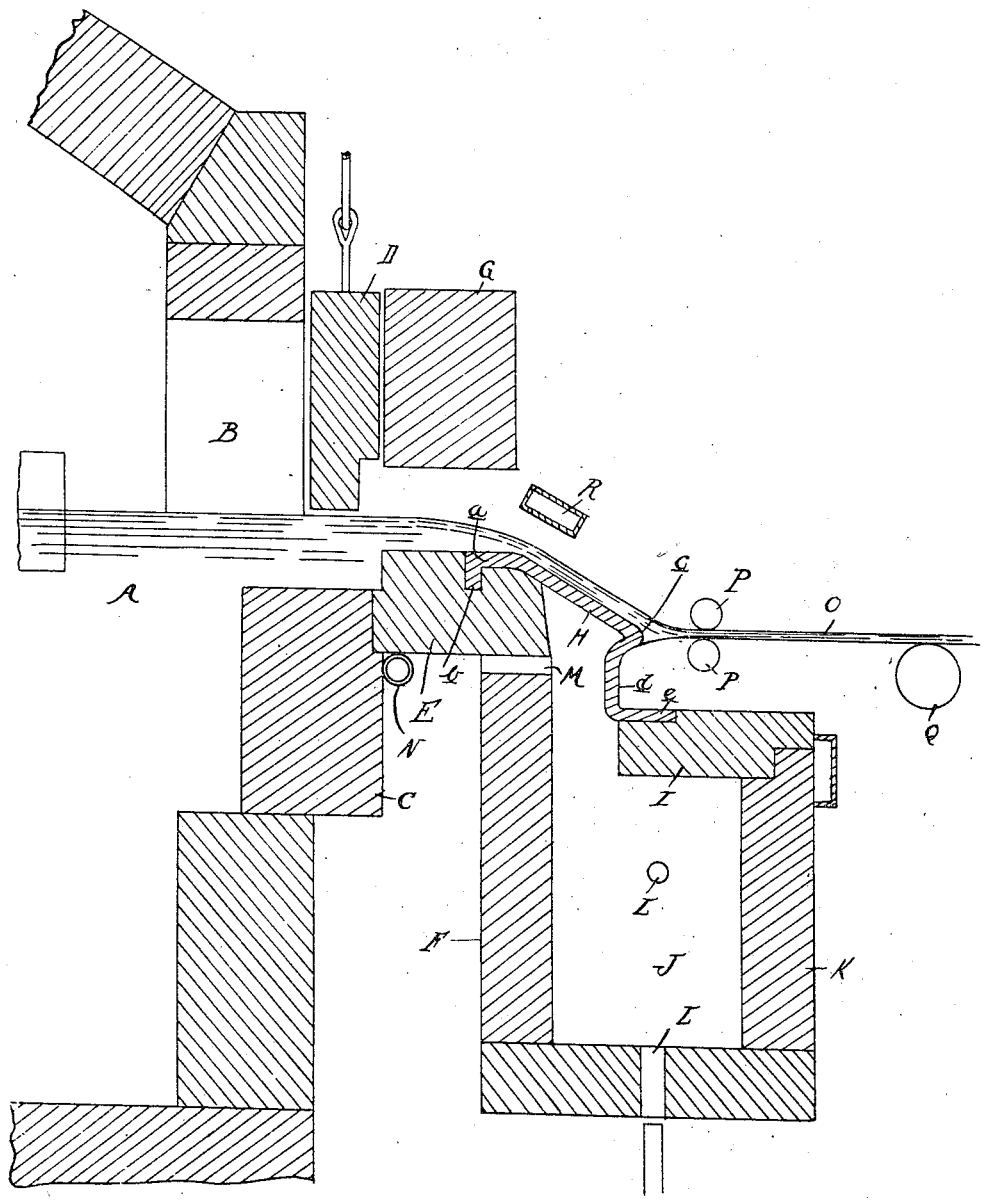
Inventor
William J. Jacobs
By [signature] Attorneys Patented May 1, 1923.

1,453,842

UNITED STATES PATENT OFFICE.

WILLIAM J. JACOBS, OF TOLEDO, OHIO, ASSIGNOR, BY MESNE ASSIGNMENTS, TO THE LIBBEY-OWENS SHEET GLASS COMPANY.

APPARATUS FOR DRAWING SHEET GLASS.

Application filed January 4, 1919. Serial No. 269,577.

*To all whom it may concern:*

Be it known that I, WILLIAM J. JACOBS, a citizen of the United States of America, residing at Toledo, in the county of Lucas and State of Ohio, have invented certain new and useful Improvements in Apparatus for Drawing Sheet Glass, of which the following is a specification, reference being had therein to the accompanying drawings.

This invention relates to an apparatus for drawing sheet glass, and more particularly to the apparatus for treating the glass preparatory to drawing it into a flat sheet of predetermined thickness; all as more fully hereinafter described.

In the drawing I show a vertical, central, longitudinal section through an apparatus embodying my invention.

A represents the glass tank having at its discharge end an arch, B. C is the top tile of the front wall, or dam block, beneath the arch, the top of this tile being below the level of the glass in the tank, as shown. D is a gate tile over the dam tile, which may be lowered to stop the flow of glass over the dam tile or raised to permit the flow.

E is a horizontal tile, preferably having its top higher than the dam tile. This tile is shown as supported on the dam tile C, by being notched into it, and its forward edge is supported by the wall, F. G is a jack arch over the tile E and separated from it slightly above the surface of the glass.

H is an inclined slab, preferably of metal, and usually made of nicrome steel. This slab, as shown, has the horizontal section $a$ having its upper surface flush with the upper face of the tile E, and an anchor lug $b$ engaging a slot in said tile; the inclined portion lettered H, which terminates in a rounded edge $c$; the substantially vertical portion $d$ which is back of the edge $c$, and the horizontal portion $e$ which rests upon the cross tile I, below which is a combustion chamber, J. The tile I is supported at its front by the wall K and suitable walls at each end close the combustion chamber.

At L L are shown burner openings through which controlled gas flames are projected into the chamber J to control the heat beneath the inclined slab H. The products of combustion from chambers J may pass out through ports M in the top of the wall F and beneath the tile E, thus heating that tile.

N is the usual cooling pipe for the joint between the tiles C and E, to "freeze" any glass which might leak through.

O represents the sheet of glass drawn from the lower edge $c$ of the inclined slab, and I have indicated at P the usual edge maintaining rollers, such as shown in numerous patents of Irving W. Colburn, and at Q a supporting roller for the sheet before it reaches the drawing mechanism. The drawing mechanism is not shown, but may be of any suitable construction, and the roller Q on the drawing mechanism should be spaced from the drawing lip a sufficient distance to draw the sheet to gage.

Above the slab H is a hollow casing, R, through which water is circulated, in any well-known manner. This cooler may be supported at various points along the glass which flows on to the slab, or at various distances from it. The usual practice is to have it rest on suitable side supports and put in or remove blocks or shims to vary the height, and adjust it by hand to different points along the slab.

The operation of the device is as follows:

The glass having melted in the tank and the gate D being raised, the glass will flow out over the tile in a shallow sheet, down the slab H. This sheet is started by the use of the usual bait, and after it is started and the width obtained so that the edge rolls grasp the edges of the sheet, the drawing mechanism will continue to draw the sheet outward as long as the glass is supplied.

The glass may be reduced to the desired drawing temperature, by means of the cooler R, and a regulation of the temperature beneath the slab H may be obtained by regulating the gas supplied into the chamber J.

By the use of the inclined slab, the glass in the tank may be kept at a lower temperature, as gravity tends to help the flow. By having the slab of metal it may be thinner and the regulation of the temperature of the stream or sheet of glass upon it more readily effected.

The use of a metallic lip, or edge, from which the glass is drawn, prevents the formation of ribs or grooves in the under surface of the drawn sheet, which sometimes appear when it is drawn from a tile or brick edge—due to the unevenness of such tile or brick structure. Even when the tile, when new, has a smooth edge, it is apt to be broken or nicked in working with the usual tools about the outlet of the furnace, and those nicks produce unevenness in the drawn glass.

I also find that it is desirable in the production of glass of good finish that the drawing lip shall be rounded.

With this inclined slab, I find I may flow the glass upon it directly into the open atmosphere, and part of the cooling may be accomplished by radiation into the room and the further cooling by the cooler R and regulation of the heat beneath.

What I claim as new is:

1. In a sheet glass drawing apparatus, the combination with a means for supplying molten glass continuously, of a metallic slab onto which the glass from the supply is adapted to flow in a continuous sheet, means for cooling the glass while on the slab, and means for stretching it from the edge of the slab into a sheet of predetermined thickness.

2. In a sheet glass drawing apparatus, the combination with a means for supplying molten glass continuously, of a slab onto which the glass from the supply is adapted to flow in the open air as a continuous sheet, a metallic drawing edge on said slab, means for cooling the glass while on the slab, and means for stretching it laterally from the edge of the slab into a sheet of predetermined thickness.

3. In a sheet glass apparatus, the combination with a tank having an outlet for molten glass, of a slab at the outlet over which the glass is adapted to flow in the open air as a continuous sheet, a cooling device above the flowing glass on the slab and a rounded discharge end on said slab, from which the glass is adapted to be drawn laterally.

4. In a sheet glass apparatus, the combination with a glass tank having a lateral outlet in the wall, of a flow block forming the bottom of said outlet, a metallic slab anchored at its inner edge and supported at its outer edge and forming an extension of the flow block, over which the glass is adapted to flow in a sheet and from which it is adapted to be drawn.

5. In a sheet glass apparatus, the combination with a glass tank having a lateral outlet in the wall and a metallic slab forming the floor over which the glass is adapted to flow in a sheet and from which it is adapted to be drawn, of a regulating heating chamber below said slab, and a cooling device above said slab.

6. In a sheet glass apparatus, the combination of a glass tank having a lateral outlet below the glass level, the flow block E, the wall F, supporting said block, the wall K separated from the wall F, the inclined slab extending beyond the wall F and having its outer edge supported by the wall K, and a heating chamber beneath the slab.

In testimony whereof I affix my signature.

WILLIAM J. JACOBS.